United States Patent [19]
Adams et al.

[11] 3,720,456
[45] March 13, 1973

[54] METHOD FOR NARROWING THE BANDWIDTH OF AN OPTICAL SIGNAL

[75] Inventors: James E. Adams, Ontario; Werner E. L. Haas, Webster, both of N.Y.

[73] Assignee: Xerox Corporation, Stamford, Conn.

[22] Filed: April 29, 1971

[21] Appl. No.: 138,506

[52] U.S. Cl. .................. 350/157, 350/147, 350/158
[51] Int. Cl. ............................................. G02b 5/30
[58] Field of Search ............... 350/147, 150, 157, 160

[56] References Cited

UNITED STATES PATENTS 3,114,836  12/1963  Fergason et al. ..................... 350/150

OTHER PUBLICATIONS

Fergason, "Cholesteric Structure-1 Optical Properties" Mol. Crystals, Vol. 1, (1966) pp. 293-307

Primary Examiner—David Schonberg
Assistant Examiner—Paul R. Miller
Attorney—James J. Ralabate, Albert A. Mahassel, David C. Petre and Gaetano D. MacCarone

[57] ABSTRACT

A method for narrowing the bandwidth of an optical signal comprising directing a linearly polarized optical signal through an optically negative liquid crystal film and a linear analyzer arranged in tandem is disclosed. The optically negative liquid crystal film is chosen to have characteristics such that some of the light is extinguished whereas the remainder escapes extinction and is transmitted.

11 Claims, 4 Drawing Figures

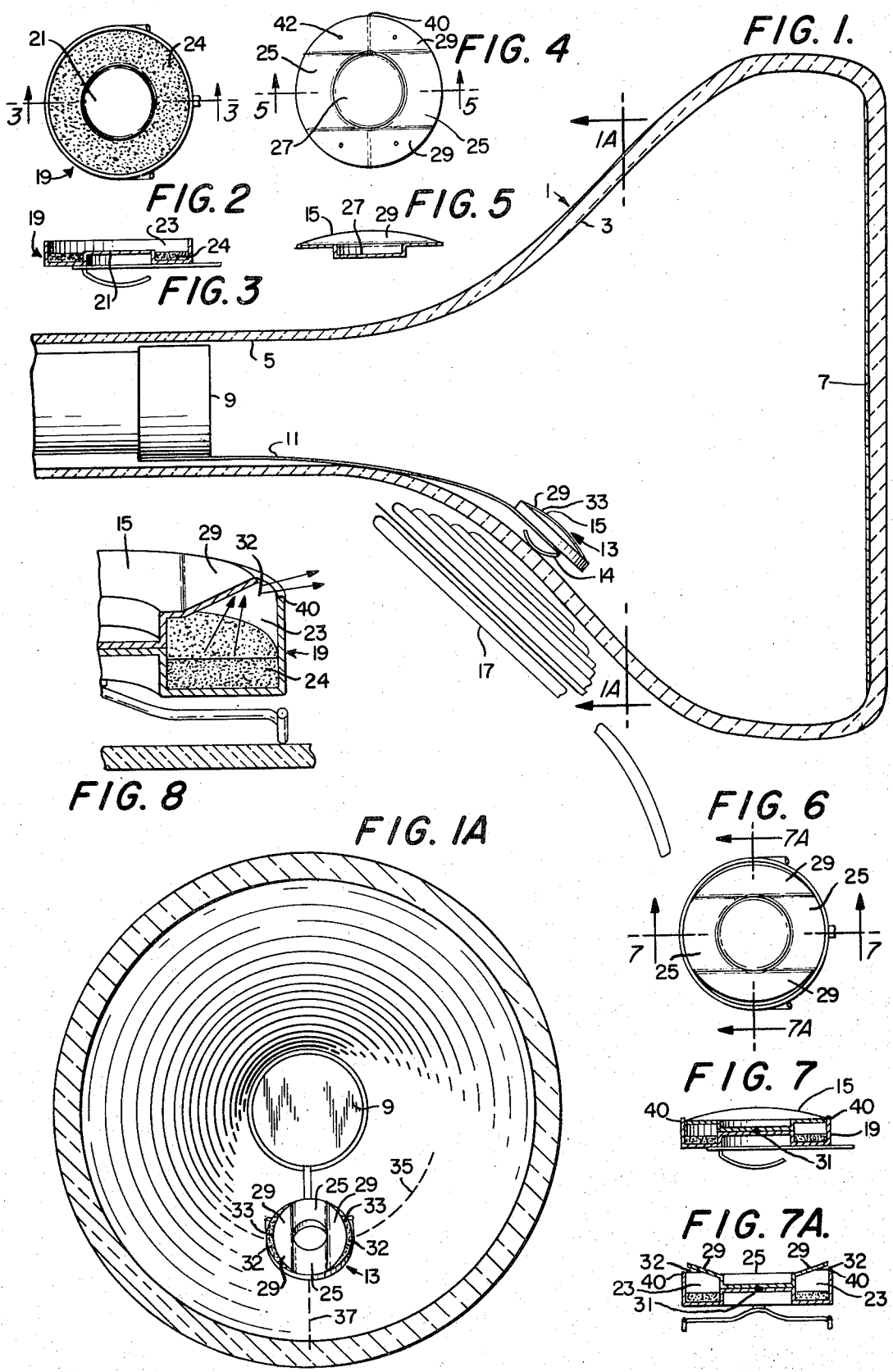

METHOD FOR NARROWING THE BANDWIDTH OF AN OPTICAL SIGNAL

BACKGROUND OF THE INVENTION

This invention relates to a method for narrowing the bandwidth of an optical signal and, more particularly, to such a method which utilizes the optical activity properties of optically negative liquid crystal films.

In the field of optics, there are many instances where optical signals having one or more discrete wavelength bands are required. For example, an optical signal containing three discrete bands of differently colored light can be used in a color display system. An optical signal of this type would also be suitable for use in polychromatic imaging systems such as color xerography and photoelectrophoresis.

Various methods are known for providing optical signals having these characteristics. Band pass filters such as the well known interference filters can be used for this purpose. Copending application Ser. No. 104,367 filed Jan. 6, 1971 now U.S. Pat. No. 3,669,525 describes a method and devices for providing these types of optical signals which involve the use of optically negative liquid crystal films. However, in some instances, the bandwidth of the discrete wavelength bands may be too broad for the particular requirements needed. Therefore, it would be desirable to have a method for narrowing the bandwidth of an optical signal to any desired width.

SUMMARY OF THE INVENTION

It is, therefore, an object of this invention to provide a method which provides the above-mentioned desirable results.

It is another object of the invention to provide a method for narrowing the bandwidth of an optical signal which makes use of the optical activity properties of optically negative liquid crystal films.

It is a further object of the invention to provide such a method which employs cholesteric liquid crystal films.

A further object of the invention is to provide such a method which can be used with optical signals in the infra-red, visible and ultra-violet regions of the electromagnetic spectrum.

Another object of the invention is to provide such a method which utilizes relatively inexpensive devices.

Still another object of the invention is to provide such a method which utilizes relatively large devices.

The foregoing objects and advantages and others are realized in accordance with the invention by directing a linearly polarized optical signal upon a device comprising an optically negative liquid crystal film and a linear analyzer element arranged in tandem. According to a preferred embodiment of the invention, where the incident optical signal is randomly polarized (or unpolarized) a linear polarizer element is arranged before the liquid crystal film to convert the optical signal to linearly polarized light. The pitch and the thickness of the optically negative liquid crystal film are selected so that some portion of the incident light is extinguished and the remainder is transmitted, the relative amounts of each being determined by the extent to which it is desired to narrow the bandwidth as will be discussed in detail hereinafter. According to the method of the invention, the bandwidth of the optical signal can be narrowed to substantially any desired width.

Birefringence, also referred to as double refraction, is an optical phenomenon characteristic of some solid crystals and most liquid crystal substances. When a beam of unpolarized or plane polarized light strikes a birefringent substance, it is split into two polarized components whose transverse vibrations are at right angles to each other. The two components are transmitted at different velocities through the substance and and emerge as beams of polarized light. By the term "optically negative liquid crystalline substance" as used herein is meant one for which the extraordinary index of refraction $n_E$ is smaller than the ordinary index of refraction $n_o$. For a detailed description of this phenomenon, see *Optical Crystallography*, Wahlstrom, 4th Edition, Wiley and Sons, Inc., New York.

Cholesteric liquid crystalline substances possess optically negative characteristics. The molecules in cholesteric liquid crystals are arranged in very thin layers with the long axes of the molecules parallel to each other and to the plane of the layers within each layer. Because of this configuration of the molecules, the direction of the long axes of the molecules in each layer is displaced slightly from the corresponding direction in adjacent layers. This displacement is cumulative over successive layers so that the overall displacement traces out a helical path. A comprehensive description of the structure of cholesteric liquid crystalline substances can be found in Gray, G. W., *Molecular Structure and The Properties of Liquid Crystals*, Academic Press, 1962.

Optically negative liquid crystalline materials have been found to possess anomalously high optical activity which changes sign at some critical wavelength $\lambda_o$ where $\lambda_o = 2\,np$ with $n$ representing the effective index of refraction of the liquid crystalline substance and $p$ the pitch or repetition distance of the helical structure of the liquid crystalline substance. Thin films of optically negative liquid crystalline substances, i.e. from about 0.5 to about 50 microns in thickness, rotate the plane of polarization of linearly polarized light by substantial amounts depending upon both the wavelength of the incident light and the pitch of the liquid crystalline substance. The relationship between rotation, film thickness and pitch is generally given by the expression $$\theta = \frac{n\pi\alpha^2\lambda_o^3}{2\lambda(\lambda_o^2 - \lambda^2)}$$

which is described by Hl. de Vries in Acta Crist. Vol. 4, 219 (1951). $\theta$ is rotation in degrees per unit thickness of the liquid crystal film; $\alpha$ is the index of refraction anisotropy and is equal to $(n_o - n_E)/n$ where n is the average of $n_o$ and $n_E$; $\lambda$ is the wavelength of the incident light and $\lambda_o$ has previously been identified. Applicants are aware that, according to the current state of the art, the equation set forth above is not considered to be completely accurate in all situations but rather may be subject to small corrections in some instances. Nevertheless it is thought to be appropriate for the purpose of providing a more complete description of the invention and is discussed herein to that end. The method of the invention has been proved to be operative through experimentation and thus it should be understood that there is no intention to limit the scope of the invention by the use of the equation.

The invention takes advantage of this phenomenon associated with optically negative liquid crystalline substances to provide a novel and highly advantageous method for narrowing the bandwidth of an optical signal. The invention will be more fully understood from the following detailed description of various preferred embodiments thereof particularly when read in conjunction with the accompanying drawings wherein:

FIG. 1 is a graphical illustration of a typical optical signal, the bandwidth of which can be narrowed by the method of the invention;

FIG. 2 is a preferred embodiment of an optical device suitable for accomplishing the purpose of the invention;

FIG. 3 is a graphical illustration showing the typical optical signal shown in FIG. 1 after it has been directed through the optical device shown in FIG. 2 according to the invention; and FIG. 4 is a graphical illustration showing a typical optical signal both before and after it has been subjected to another embodiment of the invention.

Referring now to FIG. 1, there is seen an optical signal having a gaussian-like shape with center wavelength $\lambda_s$ and half-width $\Delta \lambda_s$ as illustrated. Of course, it will be understood that the details of the shape of the optical signal illustrated are intended to be exemplary only and the invention is not limited to this particular type of optical signal. The optical signal shown can be produced by various means. Typical suitable devices which will produce such an optical signal include bandpass filters such as interference filters which, generally speaking, comprise alternating layers of a dielectric material having a relatively high index of refraction and a dielectric material having a relatively low index of refraction; liquid crystal optical filters such as are disclosed in copending application Ser. No. 104,367 filed Jan. 6, 1971 now U.S. Pat. No. 3,669,525.

According to the invention, this optical signal is directed upon an optical device such as that illustrated in FIG. 2. Referring to FIG. 2, there is shown a preferred embodiment of an optical device 10 suitable for use in the method of the invention comprising a linear polarizer element 12, an optically negative liquid crystal film 14 and a linear analyzer element 16 arranged in tandem. The elements of the device are preferably arranged in contact with each other, as shown, since this arrangement allows the linear polarizer and linear analyzer elements to also serve as protective material to keep the liquid crystal film in place and free of contamination. However, it will be appreciated that the individual elements of the device could be spaced apart from each other and in some instances this configuration is actually preferred as will be discussed further below. Where the latter arrangement is employed, of course, the liquid crystal film will have to be encased in a suitable optically transparent and isotropic material such as glass, fused silica or the like. The linear polarizer element converts any incident randomly polarized (or unpolarized) optical signal to linearly polarized light. Thus it will be recognized that where an optical signal being treated according to the method of the invention is initially linearly polarized the linear polarizer element is not necessary.

According to one embodiment of the invention, the optically negative liquid crystal film 14 is chosen to have a pitch and thickness such that incident light of wavelength $\lambda_s$ is rotated by $(2m \pm 1)\pi/2$ radians (where $m$ is any integer) and escapes extinction while incident light of wavelengths $\lambda_s \pm \Delta\lambda_s/2$ is rotated by $m\pi$ radians and is substantially completely extinguished. The result obtained is illustrated in FIG. 3. Curve A, shown by broken lines, represents the original optical signal and Curve B, shown by the solid line, represents the narrowed band optical signal which is the output from the optical device. It can be seen that according to this embodiment of the invention the halfwidth, $\Delta\lambda_s$, of the original optical signal is narrowed by approximately a factor of two and two small side bands appear. The side bands appear in the resulting optical signal because the intermediate wavelengths between $\lambda_s$ and $\lambda_s \pm \Delta \lambda_s/2$ are partially extinguished and partially unattenuated. Details concerning the preparation and testing of the materials used to obtain the results shown in FIGS. 1–3 are given in Example I below. It should be understood that the materials described in Example I are intended to be illustrative only since, as will be described hereinafter, many optically negative liquid crystalline materials are suitable for use according to the invention.

Of course, it will be understood that it is not necessary to narrow the bandwidth by a factor of two. By choosing the film pitch and thickness so that some wavelengths other than $\lambda_s \pm \Delta\lambda_s/2$ are rotated by $m\pi$ radians and substantially completely extinguished, it is possible to narrow the bandwidth of the signal to substantially any desired extent. There is, however, a trade off between the extent of narrowing and side band amplitude.

Any suitable cholesteric liquid crystalline material, mixture or composition comprising cholesteric liquid crystals or composition having cholesteric liquid crystalline characteristics may be utilized for liquid crystal film 14. Typical suitable cholesteric liquid crystal substances include derivatives from reactions of cholesterol and inorganic acids, such as, for example: cholesteryl chloride, cholesteryl bromide, cholesteryl iodide, cholesteryl fluoride, cholesteryl nitrate; esters derived from reactions of cholesterol and carboxylic acids; for example, cholesteryl crotonate; cholesteryl nonanoate, cholesteryl hexanoate; cholesteryl formate; cholesteryl docosonoate; cholesteryl chloroformate; cholesteryl propionate; cholesteryl acetate; cholesteryl valerate; cholesteryl vaccenate; cholesteryl linoleate; cholesteryl linolenate; cholesteryl oleate; cholesteryl erucate; cholesteryl butyrate; cholesteryl caproate; cholesteryl laurate; cholesteryl myristate; cholesteryl clupanodonate; ethers of cholesterol such as cholesteryl decyl ether; cholesteryl lauryl ether; cholesteryl oleyl ether; cholesteryl dodecyl ether; carbamates and carbonates of cholesterol such as cholesteryl decyl carbonate; cholesteryl oleyl carbonate; cholesteryl methyl carbonate; cholesteryl ethyl carbonate; cholesteryl butyl carbonate; cholesteryl docosonyl carbonate; cholesteryl cetyl carbonate; cholesteryl-p-nonylphenyl carbonate; cholesteryl-2-(2-ethoxyethoxy) ethyl carbonate; cholesteryl-2-(2-butoxyethoxy) ethyl carbonate; cholesteryl-2-(2-methoxyethoxy) ethyl carbonate; cholesteryl geranyl carbonate; cholesteryl heptyl carbamate; and alkyl amides and aliphatic secondary amines derived from 3$\beta$-amino $\Delta$5-cholestene and mixtures thereof; peptides such as poly-γ-benzyl-*l*-glutamate; derivatives of beta sitosterol such as sitosteryl chloride; and amyl ester of cyano benzylidene amino cinnamate. The alkyl groups in said compounds are typically saturates or unsaturated fatty acids, or alcohols, having less than about 25 carbon atoms, and unsaturated chains of less than about five double-bonded olefinic groups. Aryl groups in the above compounds typically comprise simply substituted benzene ring compounds. Any of the above compounds and mixtures thereof may be suitable for cholesteric liquid crystalline materials in the advantageous system of the present invention.

Compositions containing cholesteric liquid crystals and nematic liquid crystalline substances may also be utilized as the liquid crystal film 14; and it has been found that such compositions may contain up to 98 percent by weight of the nematic component yet continue to function in accordance with the invention. Nematic liquid crystalline materials suitable for use in combination with cholesteric liquid crystalline materials in the advantageous method of the present invention include: p-azoxyanisole, p-ozoxyanisole, p-azoxyphenetole, p-butoxybenzoic acid, p-methoxy-cinnaminic acid, butyl-p-anisylidene-p'-aminocinnamate, anisylidene para-amino-phenylacetate, p-ethoxy-benzylamino-a-methyl-cinnamic acid, 1,4-bis (p-ethoxy benzylidene) cyclo hexanone, 4,4'-dihexyloxybenzene, 4,4'-diheptyloxybenzene, anisal-p-amino-azo-benzene, anisaldazine, a-benzeneazo-(anisal-α'-naphthylamine), anisylidene-p-n-butylaniline, n,n'-nonoxybenzyltoluidine, mixtures of the above and many others.

Compositions suitable for use as liquid crystal films of the novel method may also comprise mixtures of cholesteric liquid crystals and suitable smectic liquid crystalline substances as well as mixtures of cholesteric liquid crystals and suitable non-liquid crystalline substances which are compatible with the cholesteric liquid crystal component. Typical suitable non-liquid crystalline materials include cholesterol, lecithin and the like. Typical suitable smectic liquid crystal substances include: n-propyl-4'-ethoxy biphenyl-4-carboxylate; 5-chloro-6-n-heptyloxy-2-naphthoic acid; lower temperature mesophases of cholesteryl octanoate, cholesteryl nonanoate, and other open-chain aliphatic esters of cholesterol with chain length of 7 or greater; cholesteryl oleate; sitosteryl oleate; cholesteryl decanoate; cholesteryl laurate; cholesteryl myristate; cholesteryl palmitate; cholesteryl stearate; 4'-n-alkoxy-3'-nitrobiphenyl-4-carboxylic acids ethyl-p-azoxy-cinnamate; ethyl-p-4-ethoxybenzylidene-aminocinnamate; ethyl-p-azoxybenzoate; potassium oleate; ammonium oleate; p-n-octyloxybenzoic acid; the low temperature mesophase of 2-p-n-alkoxy benzlideneamino-fluorenones with chain length of 7 or greater; the low temperature mesophase of p-(n-heptyl) oxybenzoic acid; anhydrous sodium stearate; thallium (I) stearate; mixtures thereof and others.

Mixtures of liquid crystals can be prepared in organic solvents such as chloroform, petroleum, ether and others, which are typically evaporated from the mixture thus leaving the liquid crystal composition. Alternatively, the individual components of the liquid crystalline mixture can be combined directly by heating the mixed components above the isotropic transition temperatures.

The above lists of suitable liquid crystalline materials are intended to encompass mixtures of any of the above. The list is representative of suitable materials, and is in no way intended to be exhaustive or limiting. Although any liquid crystalline composition having cholesteric liquid crystalline characteristics is suitable for use in the present invention, it should be recognized that various different cholesteric liquid crystal substances or mixtures thereof or combinations of cholesteric liquid crystal substances with other substances such as nematic liquid crystals will typically possess the desired properties which make them suitable for use according to the invention in some specific temperature range which may be at room temperature or substantially above or below room temperature. However, all of the various substances, mixtures or combinations thereof will function according to the method of the invention at some temperature. Typically, the method of the invention will be used at or near room temperature. Generally speaking, the liquid crystal substance will preferably have a liquid crystal state at the desired operational temperature. Of course, liquid crystal films having $\lambda_o$ values in the ultraviolet or infrared regions of the electromagnetic spectrum may be employed. Liquid crystal substances are known or compositions thereof may be prepared having $\lambda_o$ values of from about 2,700 A. to about 10 microns.

The liquid crystal films utilized according to the invention typically may have a thickness of from about 0.5 to about 50 microns.

Linear polarizer element 12 and linear analyzer element 16 may be selected from any of many suitable materials. Typical suitable materials include Polaroid Sheets available from Polaroid Corp. The respective axes of polarization of the linear polarizer and linear analyzer elements are preferably positioned at right angles to each other. Alternatively, by rotating one element with respect to the other it is possible to conveniently shift the position of the maxima and minima thus providing a method for "tuning" the device.

According to another embodiment of the invention, further narrowing of the optical signal can be accomplished by employing additional optical devices such as has been previously described. The bandwidth $\Delta \lambda_f$ produced by a series of N stages is approximately related to the original bandwidth, $\Delta \lambda o$, of the original signal by the expression $$\Delta \lambda_f \cong \Delta \lambda o / 2^n$$

A further advantage of this method is that arranging a plurality of stages in series does not cause excessive intensity loss since the center wavelength always passes through the linear analyzer element unattenuated. The principal losses in intensity caused by the optical stages are reflection losses. By depositing the liquid crystal film directly on the linear polarizer and linear analyzer elements, the reflection losses can essentially be reduced to the first and last surface, each of which corresponds to an approximately 4 percent loss. Of course, it will be apparent in such an arrangement that the linear analyzer element for the $N_{th}$ stage is the linear polarizer element for the N + 1 Th stage.

Referring now to FIG. 4 there is illustrated a preferred embodiment of the invention wherein an original optical signal is passed through a device which is made up of four stages such as those described above. The bandwidth of the output from each succeeding stage can be progressively narrowed and a corresponding enhancement of side band suppression can be realized.

The invention will now be further described in detail by means of specific examples, it being understood that these are intended to be illustrative only and the invention is not limited to the conditions, materials, procedures, etc. recited therein. All parts and percentages recited are by weight unless otherwise specified.

EXAMPLE I

A cholesteric liquid crystalline composition comprising about 10 percent of cholesteryl chloride and about 90 percent of cholesteryl oleyl carbonate is prepared. This composition has a $\lambda_o$ value of about 5,300 A. An approximately 12 micron thick film of the liquid crystalline composition is applied to one surface of a Polaroid Sheet and subsequently another Polaroid Sheet is placed over the liquid crystal film so that the axes of polarization of the respective Polaroid Sheets have an angular relationship of about 90° to each other.

An optical signal is provided by directing the output from a Cary 14 Spectrometer through a Gelatin Filter Roscolene No. 874 Medium Green (available from Edmund Scientific Co., Barrington, N.J.). The optical signal is then directed upon the device described above at normal incidence. The optical signal transmitted by the device has a halfwidth approximately one-half that of the original signal and also has two small side bands.

EXAMPLES II – XXI

The procedure described in Example I is repeated with the exception that the particular liquid crystalline material listed in each respective Example is used. Also an appropriate light source and an appropriate filter corresponding to the characteristics of the liquid crystalline material employed in each instance are utilized to provide the optical signal.

EXAMPLE II

A mixture of about 10 percent cholesteryl chloride and about 90 percent cholesteryl bromide having a $\lambda_o$ value of about 5,900 A.

EXAMPLE III

A mixture of about 30% cholesteryl formate and about 70% cholesteryl nonanoate having a $\lambda_o$ value of about 4000 A.

EXAMPLE IV

A mixture of about 20% cholesterol and about 80% cholesteryl chloride having a $\lambda_o$ value of about 5.0 microns.

EXAMPLE V

A mixture of about 72% cholesteryl chloride and about 28 percent of a mixture of equal parts of cholesteryl propionate and cholesteryl decanoate having a $\lambda_o$ value of about 1.3 microns.

EXAMPLE VI

A mixture of about 76 percent of a mixture of equal parts of cholesteryl chloride and cholesteryl butyrate and about 24% of a mixture of equal parts of cholesteryl formate and cholesteryl decanoate having a $\lambda_o$ value of about 1.7 microns.

EXAMPLE VII

A mixture of about 91% cholesteryl chloride and about 9% cholesteryl stearate having a $\lambda_o$ value of about 6,300 A.

EXAMPLE VIII

A mixture of about 74% cholesteryl chloride and about 26% cholesteryl acetate having a $\lambda_o$ value of about 7,700 A.

EXAMPLE IX

A mixture of about 20% cholesteryl -2-(2-butoxyethoxy) ethyl carbonate and about 80% cholesteryl chloride having a value of about 6,000 A.

EXAMPLE X

A mixture of about 45% cholesteryl-2-(2-ethoxyethoxy) ethyl carbonate and about 55% cholesteryl chloride having a $\lambda_o$ value of about 8,000 A.

EXAMPLE XI

A mixture of about 50% cholesteryl-2-(2-ethoxyethoxy) ethyl carbonate and about 50% cholesteryl-n-propyl carbonate having a $\lambda_o$ value of about 9,000 A.

EXAMPLE XII

A mixture of about 89% cholesteryl chloride and about 11% cholesteryl caprate having a $\lambda_o$ value of about 6,200 A.

EXAMPLE XIII

A mixture of about 88% cholesteryl chloride and about 12% cholesteryl caprylate having a $\lambda_o$ value of about 6,400 A.

EXAMPLE XIV

A mixture of about 84% cholesteryl chloride and about 16% cholesteryl valerate having a $\lambda_o$ value of about 7,100 A.

EXAMPLE XV

A mixture of about 86% cholesteryl chloride and about 14 percent cholesteryl heptamoate having a $\lambda_o$ value of about 7,100 A.

EXAMPLE XVI

A mixture of about 90% cholesteryl chloride and about 10% cholesteryl laurate having a $\lambda_o$ value of about 6,600 A.

EXAMPLE XVII

A mixture of about 85% cholesteryl chloride and about 15% cholesteryl myristate having a $\lambda_o$ value of about 9,600 A.

EXAMPLE XVIII

A mixture of about 93% cholesteryl chloride and about 7% cholesteryl palmitate having a $\lambda_o$ value of about 5,900 A.

EXAMPLE XIX

A mixture of about 20% cholesterol and about 80% of a mixture of equal parts of cholesteryl chloride and cholesteryl oleyl carbonate having a $\lambda_o$ value of about 9,500 A.

EXAMPLE XX

A mixture of about 80% cholesteryl -2-(2-butoxyethoxy) ethyl carbonate and about 20% cholesteryl-n-propyl carbonate having a $\lambda_o$ value of about 1.25 microns.

EXAMPLE XXI

A mixture of about 20% cholesterol and about 80% cholesteryl oleyl carbonate having a $\lambda_o$ value of about 5,500 A.

While the invention has been described in detail with respect to various embodiments thereof it is not intended to be limited thereto but rather it will be appreciated by those skilled in the art that modifications and variations are possible which are within the spirit of the invention and the scope of the claims.

What is claimed is:

1. A method for narrowing the bandwidth of an optical signal comprising the steps of:
    a. providing a linearly polarized optical signal having a center wavelength $\lambda_s$ and a bandwidth $\Delta\lambda_s$;
    b. providing an optical device comprising at least one stage comprising an optically negative liquid crystal film having a reflection band with center wavelength $\lambda_o$, and a linear analyzer element arranged in tandem, said optically negative liquid crystal film of each said stage having a pitch and thickness selected such that said stage is capable of transmitting light of wavelength $\lambda_s$ substantially completely unattenuated and substantially completely extinguishing some of the other wavelengths of light within said optical signal; and
    c. directing said optical signal upon said optical device, wherein light of wavelength $\lambda_s$ is transmitted substantially completely unattenuated and some of the other wavelengths of light within said optical signal are substantially completely extinguished
    whereby the bandwidth of the optical signal is narrowed.

2. The method as defined in claim 1 wherein said liquid crystal film of at least one stage is selected to have a pitch and thickness such that said stage is capable of transmitting light of wavelength $\lambda_s$ substantially completely unattenuated and substantially completely extinguishing light of wavelengths $\lambda_s \pm 2 \Delta\lambda_s$.

3. The method as defined in claim 1 wherein each said optically negative liquid crystal film has a $\lambda_o$ value in the visible region of the electromagnetic spectrum.

4. The method as defined in claim 1 wherein each said optically negative liquid crystal film comprises a material selected from the group consisting of: cholesteric liquid crystalline substances; mixtures of cholesteric liquid crystalline substances and nematic liquid crystalline substances; mixtures of cholesteric liquid crystalline substances and smectic liquid crystalline substances, mixtures of cholesteric liquid crystalline substances and non-liquid crystalline substances which are compatible with cholesteric liquid crystalline substances; and mixtures thereof.

5. The method as defined in claim 1 wherein the thickness of each said optically negative liquid crystal film is in the range of from about 0.5 to about 50 microns.

6. A method for narrowing the bandwidth of an optical signal comprising the steps of:
    a. providing an optical signal having a center wavelength and a bandwidth $\Delta\lambda_s$;
    b. providing an optical device comprising at least one stage comprising a linear polarizer element, an optically negative liquid crystal film having a reflection band with center wavelength $\lambda_o$, and a linear analyzer element arranged in tandem, said optically negative liquid crystal film of each said stage having a pitch and thickness selected such that said stage is capable of transmitting light of wavelength $\lambda_s$ substantially completely unattenuated and substantially completely extinguishing some of the other wavelengths of light within said optical signal; and
    c. directing said optical signal upon said optical device, wherein light of wavelength $\lambda_s$ is transmitted substantially completely unattenuated and some of the other wavelengths of light within said optical signal are substantially completely extinguished
    whereby the bandwidth of the optical signal is narrowed.

7. The method as defined in claim 6 wherein said liquid crystal film of at least one stage is selected to have a pitch and thickness such that said stage is capable of transmitting light of wavelength $\lambda_s$ substantially completely unattenuated and substantially completely extinguishing light of wavelengths $\lambda_s \pm 2 \Delta\lambda_s$.

8. The method as defined in claim 6 wherein each said optically negative liquid crystal film has a $\lambda_o$ value in the visible region of the electromagnetic spectrum.

9. The method as defined in claim 6 wherein each said optically negative liquid crystal film comprises a material selected from the group consisting of: cholesteric liquid crystalline substances; mixtures of cholesteric liquid crystalline substances and nematic liquid crystalline substances; mixtures of cholesteric liquid crystalline substances and smectic liquid crystalline substances, mixtures of cholesteric liquid crystalline substances and non-liquid crystalline substances which are compatible with cholesteric liquid crystalline substances; and mixtures thereof.

10. The method as defined in claim 6 wherein the thickness of each said optically negative liquid crystal film is in the range of from about 0.5 to about 50 microns.

11. The method as defined in claim 6 wherein the axes of polarization of the linear polarizer element and the linear analyzer element of at least one stage of said optical device have an angular relationship of 90° to each other.

* * * * *